(12) United States Patent
Wiesinger et al.

(10) Patent No.: US 10,018,100 B2
(45) Date of Patent: Jul. 10, 2018

(54) INTERNAL COMBUSTION ENGINE

(71) Applicant: BRP-ROTAX GMBH & CO. KG, Gunskirchen (AT)

(72) Inventors: Petra Wiesinger, Aichkirchen/Lambach (AT); Thomas Rothkegel, Steinhaus (AT); Michael Gumpesberger, Haid (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 169 days.

(21) Appl. No.: 15/218,934

(22) Filed: Jul. 25, 2016

(65) Prior Publication Data

US 2018/0023452 A1   Jan. 25, 2018

(51) Int. Cl.
| | |
|---|---|
| *F01P 1/02* | (2006.01) |
| *F01P 3/02* | (2006.01) |
| *F01P 5/10* | (2006.01) |
| *F02B 75/02* | (2006.01) |
| *F02B 75/18* | (2006.01) |
| *F02B 61/00* | (2006.01) |

(Continued)

(52) U.S. Cl.
CPC ............... *F01P 3/02* (2013.01); *B62M 27/02* (2013.01); *F01P 5/10* (2013.01); *F01P 11/04* (2013.01); *F02B 61/00* (2013.01); *F02B 75/02* (2013.01); *F02B 75/18* (2013.01); *F02F 1/10* (2013.01); *F02F 1/22* (2013.01); *B62M 2027/023* (2013.01); *F01P 2003/021* (2013.01); *F02B 2075/025* (2013.01); *F02B 2075/1808* (2013.01)

(58) Field of Classification Search
CPC ...... F01P 3/02; F01P 11/04; F01P 5/10; F01P 2003/021; F02B 61/00; F02B 75/02; F02B 75/18; F02B 2075/025; F02B 2075/1808; B62M 27/02; B62M 2027/023; F02F 1/10; F02F 1/22
See application file for complete search history.

(56) References Cited

U.S. PATENT DOCUMENTS

| | | | |
|---|---|---|---|
| 4,736,716 A | 4/1988 | Ohyama | |
| 5,025,760 A | 6/1991 | Webb et al. | |

(Continued)

FOREIGN PATENT DOCUMENTS

| | | |
|---|---|---|
| JP | H06346784 A | 12/1994 |
| JP | H08270496 A | 10/1996 |

OTHER PUBLICATIONS

English Abstract of JPH06346784A, retrieved from https://worldwide.espacenet.com/ on Sep. 12, 2016.

(Continued)

*Primary Examiner* — Hung Q Nguyen
(74) *Attorney, Agent, or Firm* — BCF LLP

(57) ABSTRACT

An internal combustion engine has a cooling jacket defined in the cylinder block for cooling at least an exhaust side of the cylinder. The cooling jacket at least partially surrounds the cylinder and includes a first cooling passage positioned between the exhaust passage and the first auxiliary exhaust passage, and a second cooling passage positioned between the exhaust passage and the second auxiliary exhaust passage. The cooling jacket on at least the exhaust side of the cylinder comprises an upper portion and a lower portion which are in fluid communication with each other via at least one of the first cooling passage and the second cooling passage.

19 Claims, 17 Drawing Sheets

(51) Int. Cl.
*F01P 11/04* (2006.01)
*F02F 1/22* (2006.01)
*F02F 1/10* (2006.01)
*B62M 27/02* (2006.01)

(56) References Cited

U.S. PATENT DOCUMENTS

| | | | |
|---|---|---|---|
| 5,220,890 A | 6/1993 | Koriyama | |
| 7,278,382 B1 * | 10/2007 | Kyuma | F01P 1/08 123/193.2 |
| 8,171,897 B2 * | 5/2012 | Sugiura | F01P 1/02 123/41.01 |

OTHER PUBLICATIONS

English abstract of JPH08270496; retrieved from https://worldwide.espacenet.com/ on Jul. 25, 2016.

* cited by examiner

INTERNAL COMBUSTION ENGINE

TECHNICAL FIELD

The present disclosure relates generally to an internal combustion engine, more specifically but not limited to a cooling jacket of a two-stroke internal combustion engine.

BACKGROUND

During operation, an internal combustion engine generates heat due to the combustion process taking place inside each cylinder of the engine.

An exhaust side of the engine block, through which hot exhaust gases flow from a combustion chamber to an exhaust of the engine, can be particularly susceptible to overheating. Overheating can result in thermal expansion and distortion of portions of the engine block thereby increasing the risk of piston seizure in the cylinder.

Engines with liquid cooling systems are generally provided with cooling passages inside the engine block, known as cooling jackets, through which liquid circulates and can absorb heat from the engine. However, engines with cooling jackets can still be susceptible to overheating in certain parts therein.

Thus, there is a need for an internal combustion engine that alleviates at least some of the abovenoted drawbacks.

SUMMARY

It is an object of the present technology to ameliorate at least some of the inconveniences present in the prior art.

From one aspect, there is provided an internal combustion engine comprising: a crankcase; a crankshaft adapted to rotate about a crankshaft axis and disposed at least in part in the crankcase; a cylinder block connected to the crankcase, the cylinder block defining a cylinder having a cylinder axis; a cylinder head connected to the cylinder block, the cylinder block disposed between the cylinder head and the crankcase, a piston disposed in the cylinder and operatively connected to the crankshaft, the cylinder, the cylinder head and the piston together defining at least one combustion chamber; an intake port defined by the cylinder block for allowing at least one combustion component to enter the combustion chamber; an exhaust port defined by the cylinder block, on an exhaust side of the internal combustion engine, for allowing exhaust gas to exit the combustion chamber through an exhaust passage extending from the exhaust port in the cylinder block; a first auxiliary exhaust port defined by the cylinder block and a second auxiliary exhaust port defined by the cylinder block, the first and second auxiliary exhaust ports positioned circumferentially one on either side of the exhaust port and connected to the cylinder for allowing exhaust gas to exit the combustion chamber; a first auxiliary exhaust passage in the cylinder block extending from the first auxiliary port; a second auxiliary exhaust passage in the cylinder block extending from the second auxiliary port; a cooling jacket defined in the cylinder block for cooling at least an exhaust side of the cylinder, the cooling jacket at least partially surrounding the cylinder and including a first cooling passage positioned between the exhaust passage and the first auxiliary exhaust passage, and a second cooling passage positioned between the exhaust passage and the second auxiliary exhaust passage, the cooling jacket on at least the exhaust side of the cylinder comprising an upper portion and a lower portion, the upper and lower portions of the cooling jacket being in fluid communication with each other via at least one of the first cooling passage and the second cooling passage. In certain implementations, the first and second auxiliary passages extend from the first and second auxiliary ports respectively and communicate with the main exhaust passage.

In certain implementations and aspects, the first cooling passage is formed in the cylinder block, proximate the cylinder, and between the first auxiliary exhaust passage and the exhaust passage, and the second cooling passage is formed in the cylinder block, proximate the cylinder, and inbetween the second auxiliary exhaust passage and the exhaust passage.

In certain implementations and aspects, the first cooling passage is formed in a first bridge of the cylinder block, the first bridge being proximate the cylinder and separating the first auxiliary exhaust passage from the exhaust passage, and wherein the second cooling passage is formed in a second bridge of the cylinder block, the second bridge being proximate the cylinder and separating the second auxiliary exhaust passage from the exhaust passage.

In certain implementations and aspects, the first cooling passage is the most proximate part of the cooling jacket to the cylinder in the first bridge, and the second cooling passage is the most proximate part of the cooling jacket to the cylinder in the second bridge.

In certain implementations and aspects, the first cooling passage and the second cooling passage extend in a direction from the cylinder head to the crankcase.

In certain implementations and aspects, the first cooling passage has a first cooling passage axis, and the second cooling passage has a second cooling passage axis, the first and second cooling passage axes being substantially parallel to one another.

In certain implementations and aspects, the first and the second cooling passages are cylindrical.

In certain implementations and aspects, the cooling jacket is arranged to contain coolant therein, the first and second cooling passages being arranged to allow coolant to flow therethrough in a direction from the lower portion of the cooling jacket to the upper portion of the cooling jacket.

In certain implementations and aspects, the first and the second auxiliary exhaust ports are positioned circumferentially proximate the exhaust port.

In certain implementations and aspects, at least a portion of the cooling jacket extends around the first and the second auxiliary exhaust passages, along at least a portion of a length of the first and the second auxiliary exhaust passages.

In certain implementations and aspects, the cooling jacket is a first cooling jacket, the internal combustion engine further comprising a second cooling jacket at least partially surrounding the crankcase, the second cooling jacket being fluidly connected to the first cooling jacket.

In certain implementations and aspects, the first and second cooling jackets are part of a cooling circuit, the cooling circuit further including: an outlet at the cylinder head, the outlet being connected via an external conduit to a pump positioned at a lower portion of the crankcase for pumping coolant through the first and second cooling jackets and for receiving coolant from the cylinder head via the conduit.

In certain implementations and aspects, the internal combustion engine is a two-stroke engine, and further comprises scavenge ports.

In certain implementations and aspects, the cylinder comprises at least two adjacent cylinders.

In certain implementations and aspects, the internal combustion engine is a two-stroke engine, the first cooling passage being formed in the cylinder block, proximate the cylinder, and in a first bridge between the first and auxiliary exhaust passage and the exhaust passage, and the second cooling passage being formed in the cylinder block, proximate the cylinder, in a second bridge between the second auxiliary exhaust passage and the exhaust passage, wherein the first and second cooling passages are substantially upright and are arranged to allow coolant contained within the cooling jacket to flow from the lower portion of the cooling jacket to the upper portion of the cooling jacket.

From another aspect, there is provided a snowmobile a frame having a forward end and a rearward end; a drive track assembly disposed below and supporting the rearward end of the frame; a front suspension connected to the forward end of the frame; two skis connected to the front suspension; an internal combustion engine as described above, the internal combustion engine mounted on the frame and operatively connected to the drive track via a drive train for delivering propulsive power to the drive track.

From another aspect, there is provided an internal combustion engine comprising: a crankcase; a crankshaft adapted to rotate about a crankshaft axis and disposed at least in part in the crankcase; a cylinder block connected to the crankcase, the cylinder block defining a cylinder having a cylinder axis; a cylinder head connected to the cylinder block, the cylinder block disposed between the cylinder head and the crankcase; a piston disposed in the cylinder and operatively connected to the crankshaft, the cylinder, the cylinder head and the piston together defining at least one combustion chamber; an intake port defined by the cylinder block for allowing at least one combustion component to enter the combustion chamber; an exhaust port defined by the cylinder block, on an exhaust side of the internal combustion engine, for allowing exhaust gas to exit the combustion chamber through an exhaust passage extending from the exhaust port in the cylinder block; an auxiliary exhaust port defined by the cylinder block positioned proximate the exhaust port and connected to the cylinder for allowing exhaust gas to exit the combustion chamber; an auxiliary exhaust passage in the cylinder block extending from the first auxiliary port; and a cooling jacket defined in the cylinder block for cooling at least an exhaust side of the cylinder, the cooling jacket at least partially surrounding the cylinder and including a cooling passage positioned between the exhaust passage and the auxiliary exhaust passage, the cooling jacket on at least the exhaust side of the cylinder comprising a first portion and a second portion, the first and second portions of the cooling jacket being in fluid communication with each other via at least the cooling passage.

In certain implementations and aspects, the cooling passage is formed in the cylinder block, proximate the cylinder, and between the auxiliary exhaust passage and the exhaust passage.

In certain implementations and aspects, the cooling passage extends in a circumferential direction. In certain implementations, the cooling passage extends in a direction from the intake port towards the crankcase. The cooling passage can be orientated substantially horizontally in use. In certain implementations and aspects, the cooling passage is arranged to allow flow of coolant therethrough.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
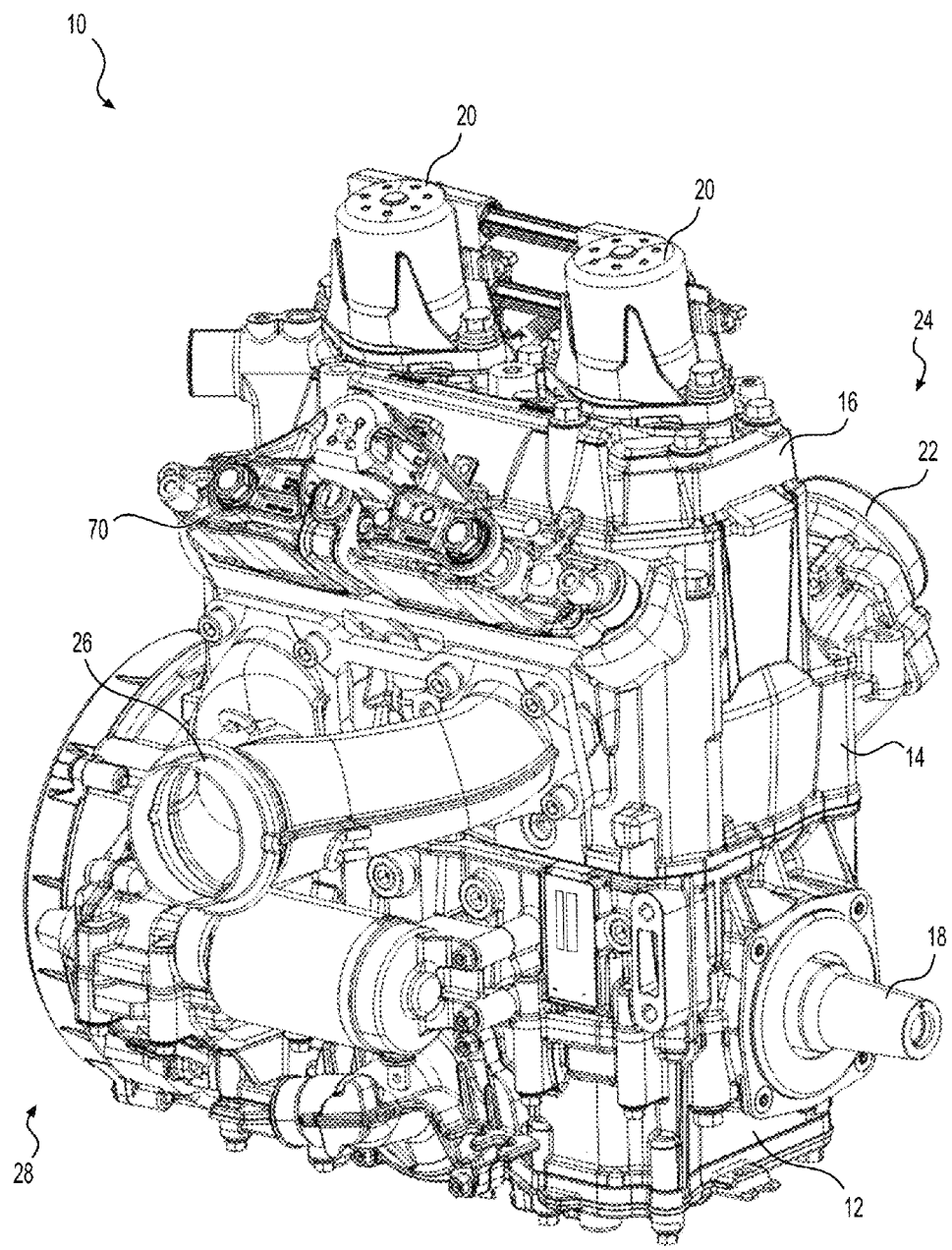
FIG. 1 is a perspective view, taken from an exhaust side, of an internal combustion engine including a cylinder block and a crankshaft, according to certain implementations of the present disclosure.
Figure 2:
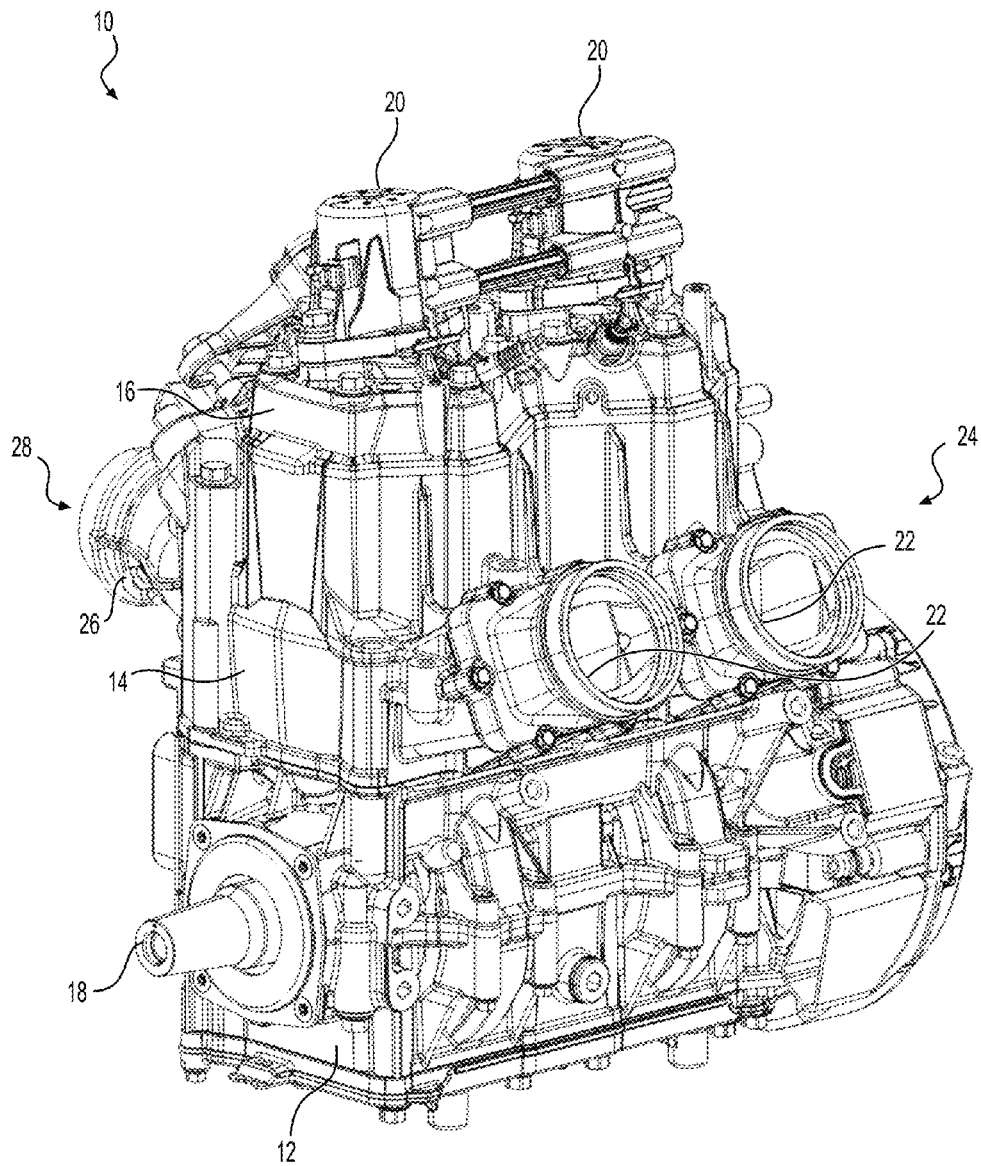
FIG. 2 is a perspective view, taken from an intake side, of the internal combustion engine of FIG. 1.
Figure 3:
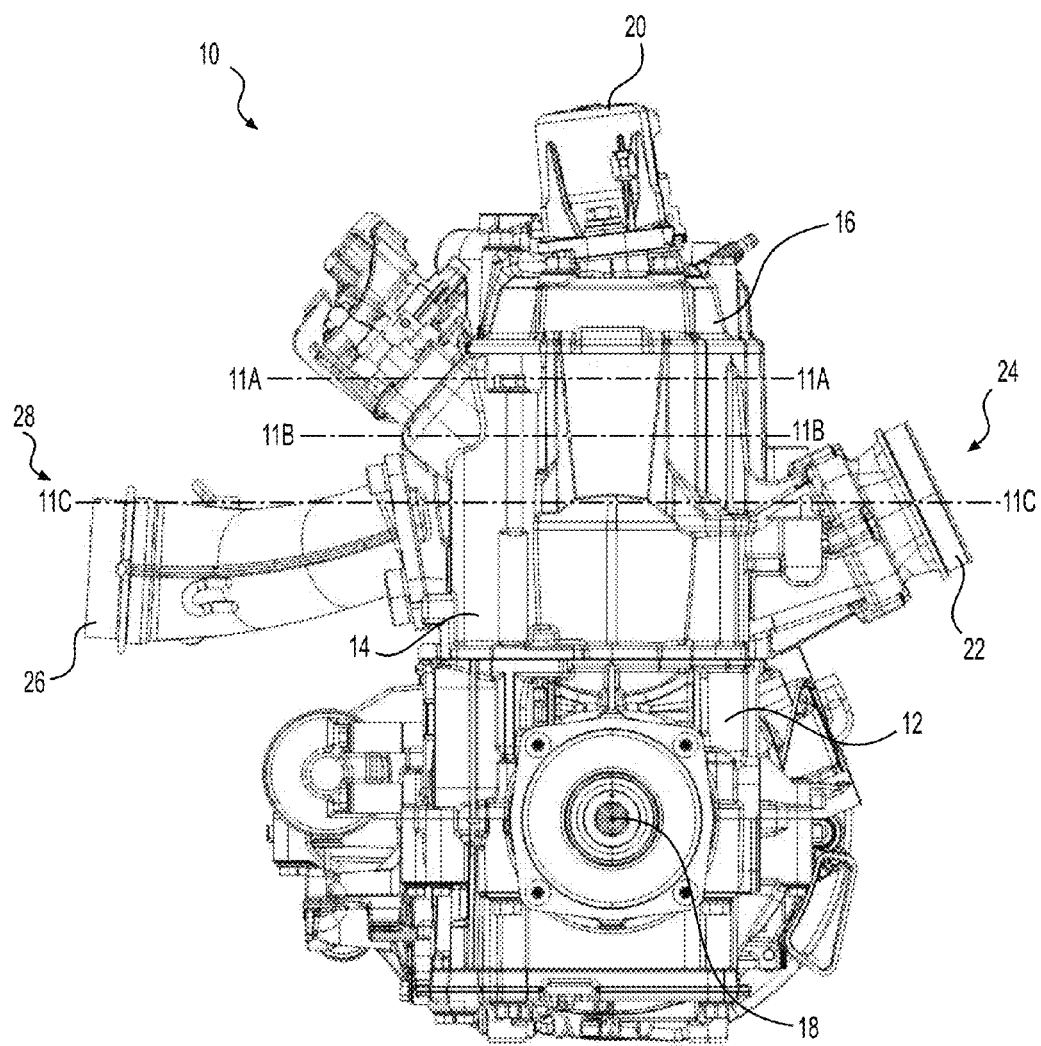
FIG. 3 is an end view of the internal combustion engine of FIG. 1.
Figure 4:
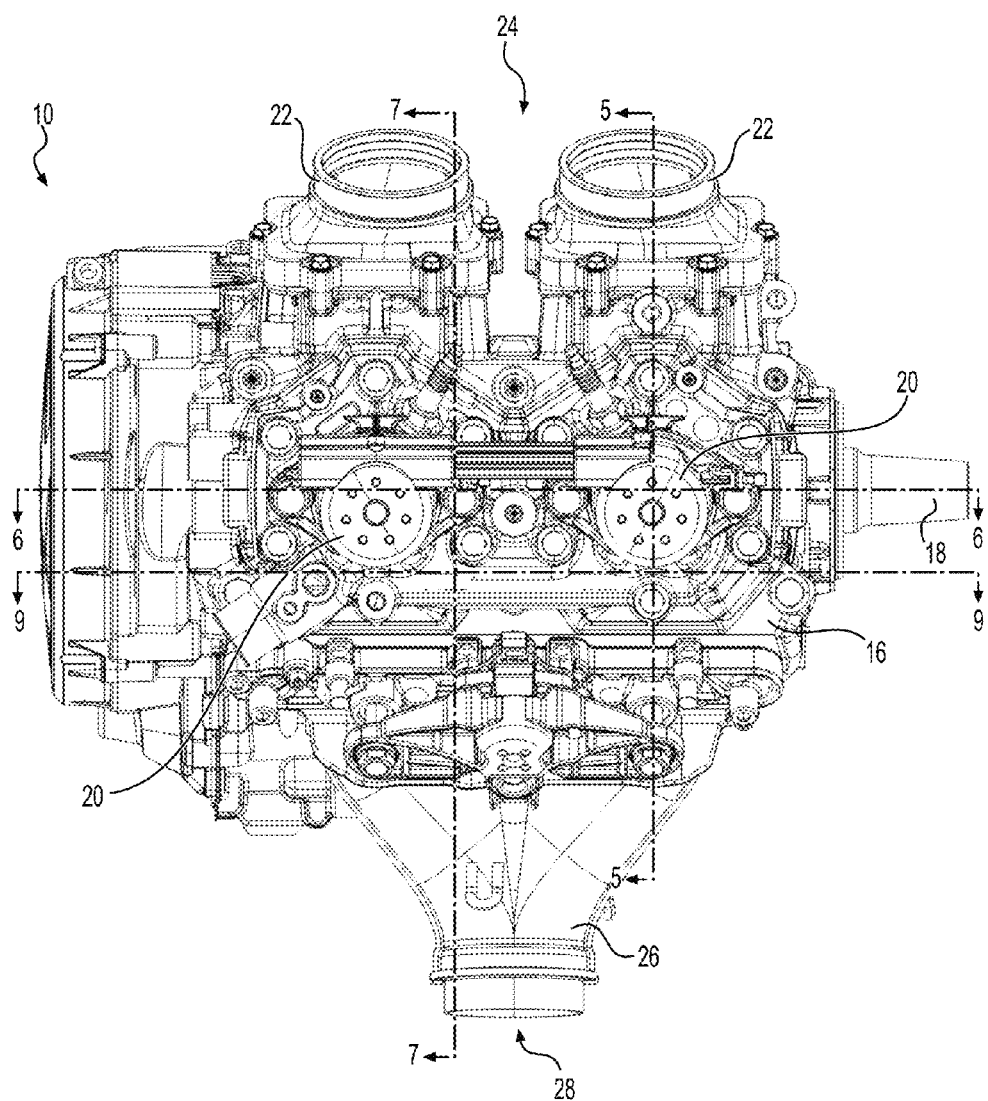
FIG. 4 is a top plan view of the internal combustion engine of FIG. 1.

One embodiment of an internal combustion engine including a cooling jacket according to the present disclosure will be described herein with reference to FIGS. 1 to 15. The illustrated engine 10 is a high pressure direct fuel injection, two-stroke, two-cylinder, 850 cc inline engine. It is however contemplated that aspects of the cooling jacket described below could also be used in other types of engines, such as, but not limited to, carbureted or semi-direct injection engines and/or engines using low pressure fuel pumps.

As seen in FIGS. 1 to 5, the engine 10 has a crankcase 12, a cylinder block 14, and a cylinder head 16. A crankshaft 18 is rotatably disposed inside the crankcase 12. A portion of the crankshaft 18 extends out through a wall of the crankcase 12 to be operatively connected to an element to be driven by the engine 10, such as a wheel of a motorcycle or an endless track of a snowmobile. It is also contemplated that the crankshaft 18 could be operatively connected to the input shaft of a transmission providing gear reduction to a wheel, track, propeller and the like.

Two fuel injectors 20 are connected to the cylinder head 16 at a top side of the engine 10 to supply fuel for the combustion process of the engine 10. The fuel injectors 20 in the illustrated embodiment of the engine comprise an integrated pump and nozzle system, in which the fuel injector is actuated by a solenoid and operates at injection pressures of 30 to 40 bar. It is contemplated that other kinds of fuel injectors 20 could also be used.

Two intake sockets 22 are connectable to throttle valves (not shown) in a manner known in the art. The intake sockets 22 are connected to an intake side 24 of the cylinder block 14 to supply air to the engine 10 for the combustion process. An exhaust manifold 26 is connected to an exhaust side 28 of the cylinder block 14 to receive exhaust gases resulting from the combustion process occurring in the engine 10. The exhaust side 28 of the engine 10 is opposite the intake side 24 of the engine 10.

Figure 5:
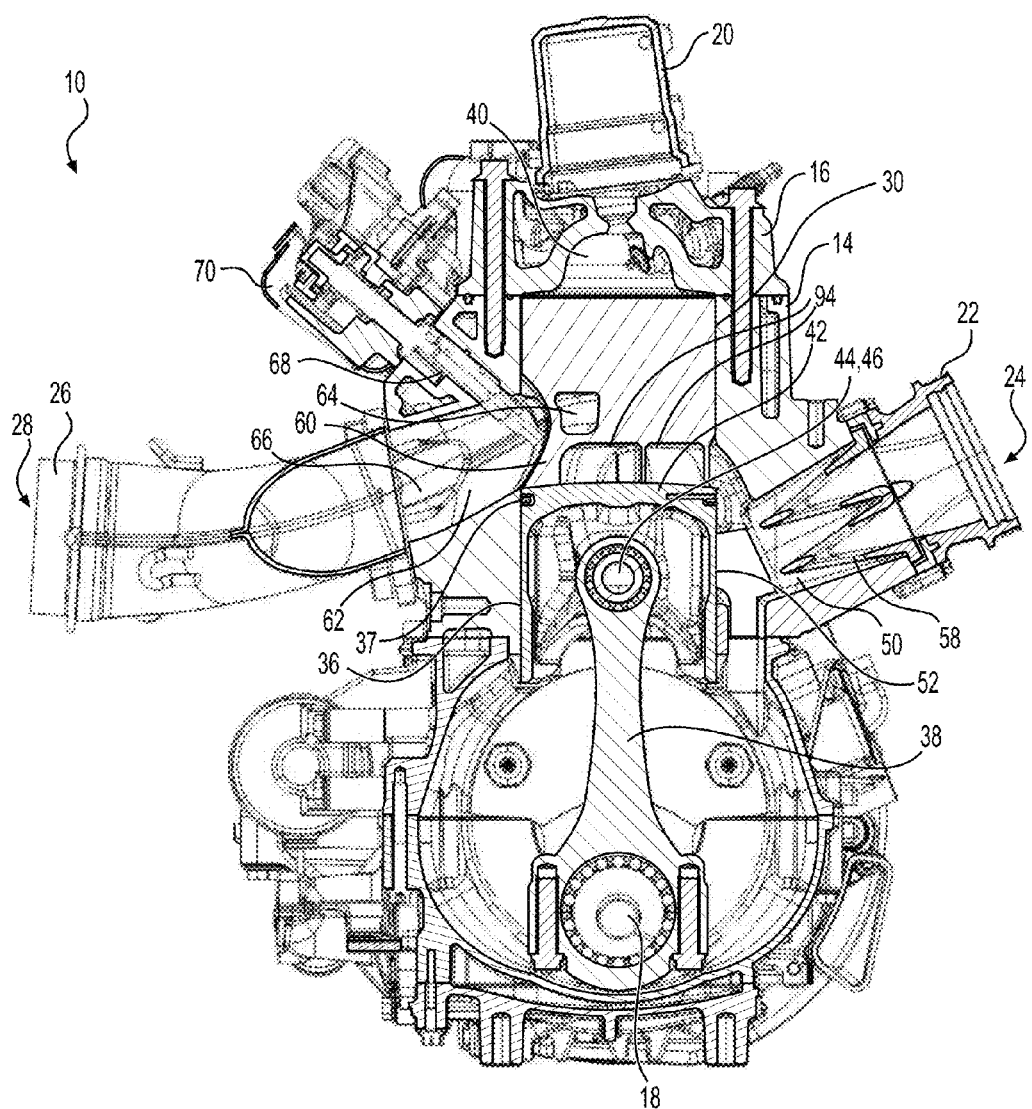
FIG. 5 is a cross-sectional view of the internal combustion engine of FIG. 1, taken along the line 5-5 of FIG. 4.
Figure 6:
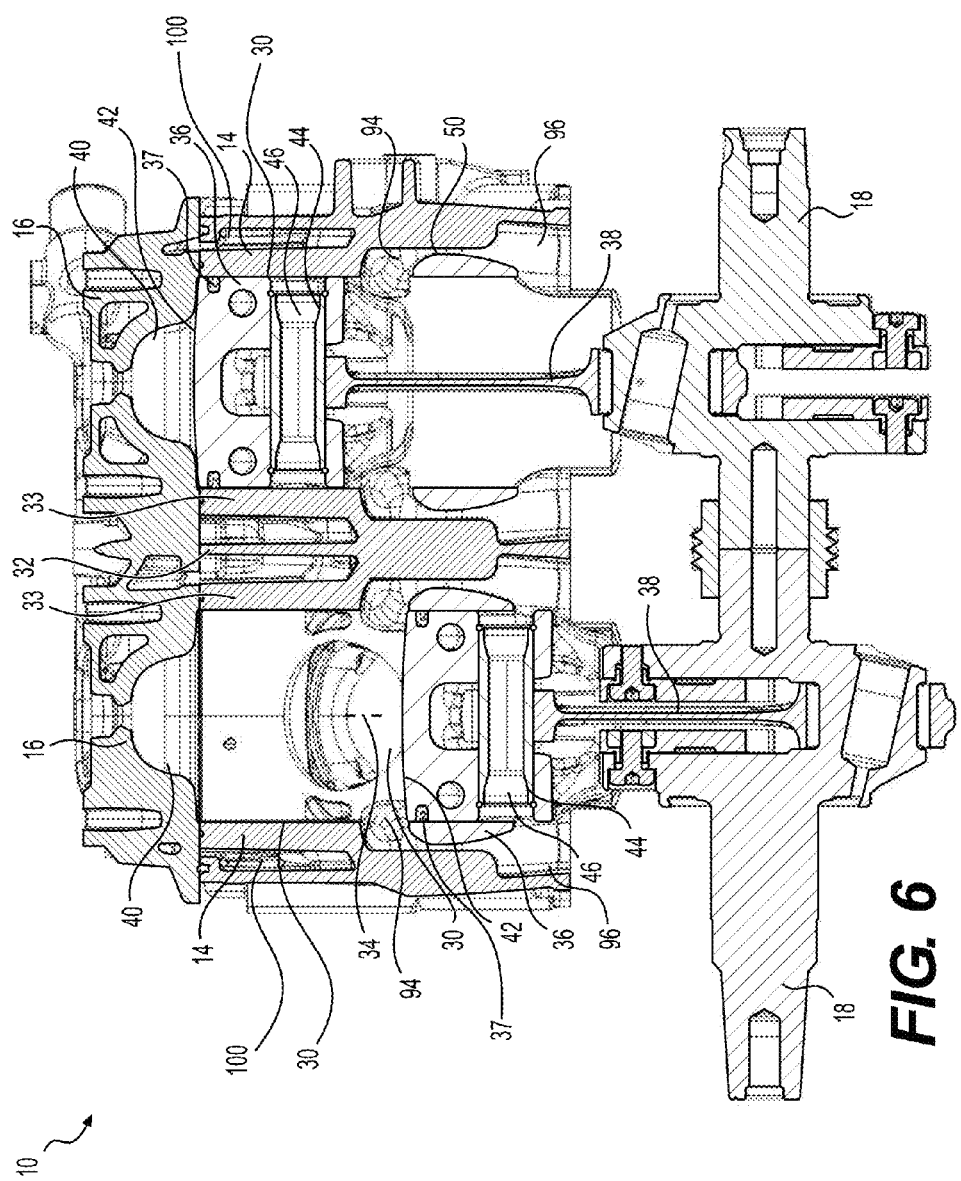
FIG. 6 is a cross-sectional view of the internal combustion engine of FIG. 1, taken along the line 6-6 of FIG. 4.
Figure 7:
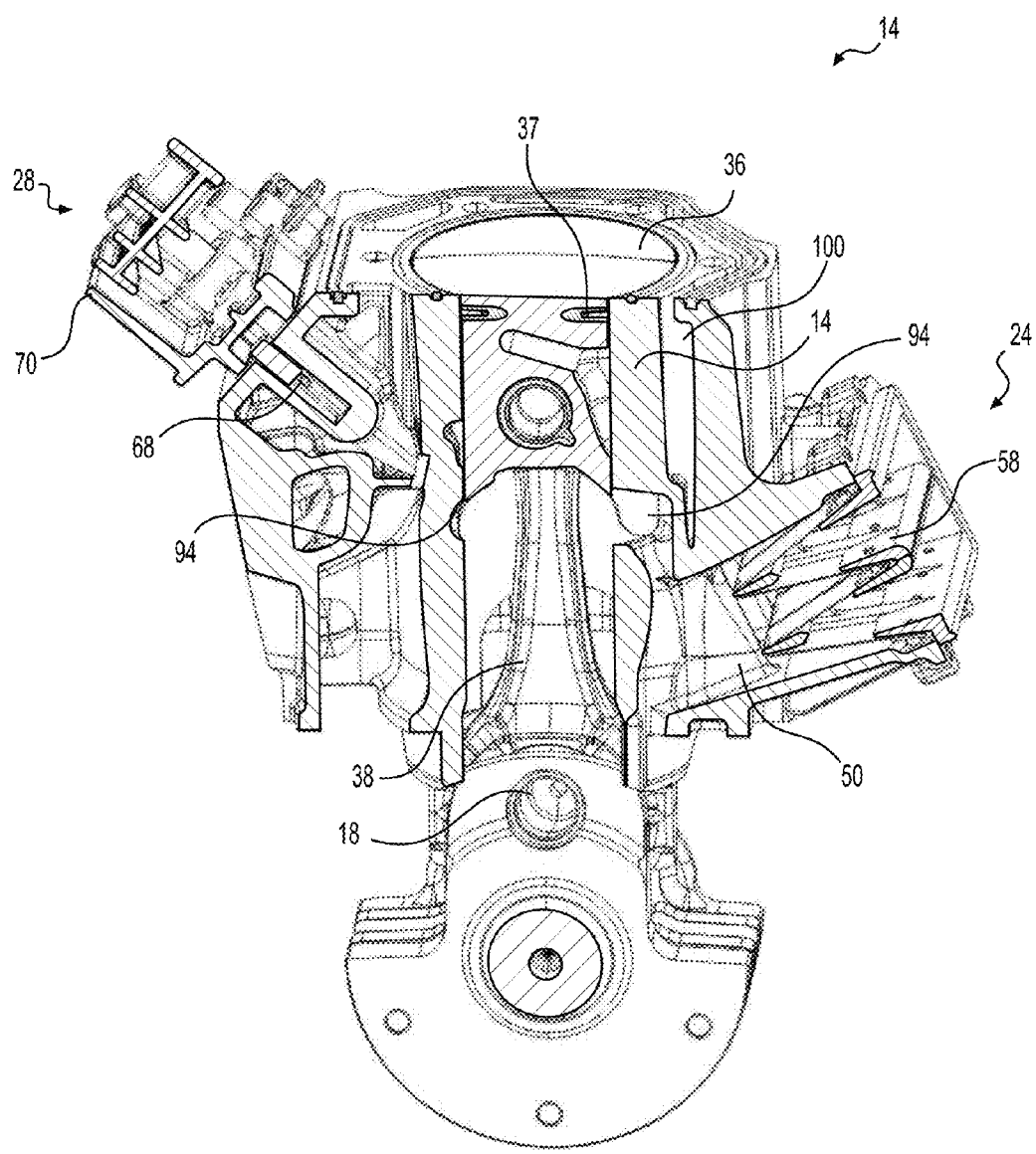
FIG. 7 is a perspective cross-sectional view of the internal combustion engine of FIG. 1, taken along the line 7-7 of FIG. 4 with the crankcase removed for clarity.
Figure 8:
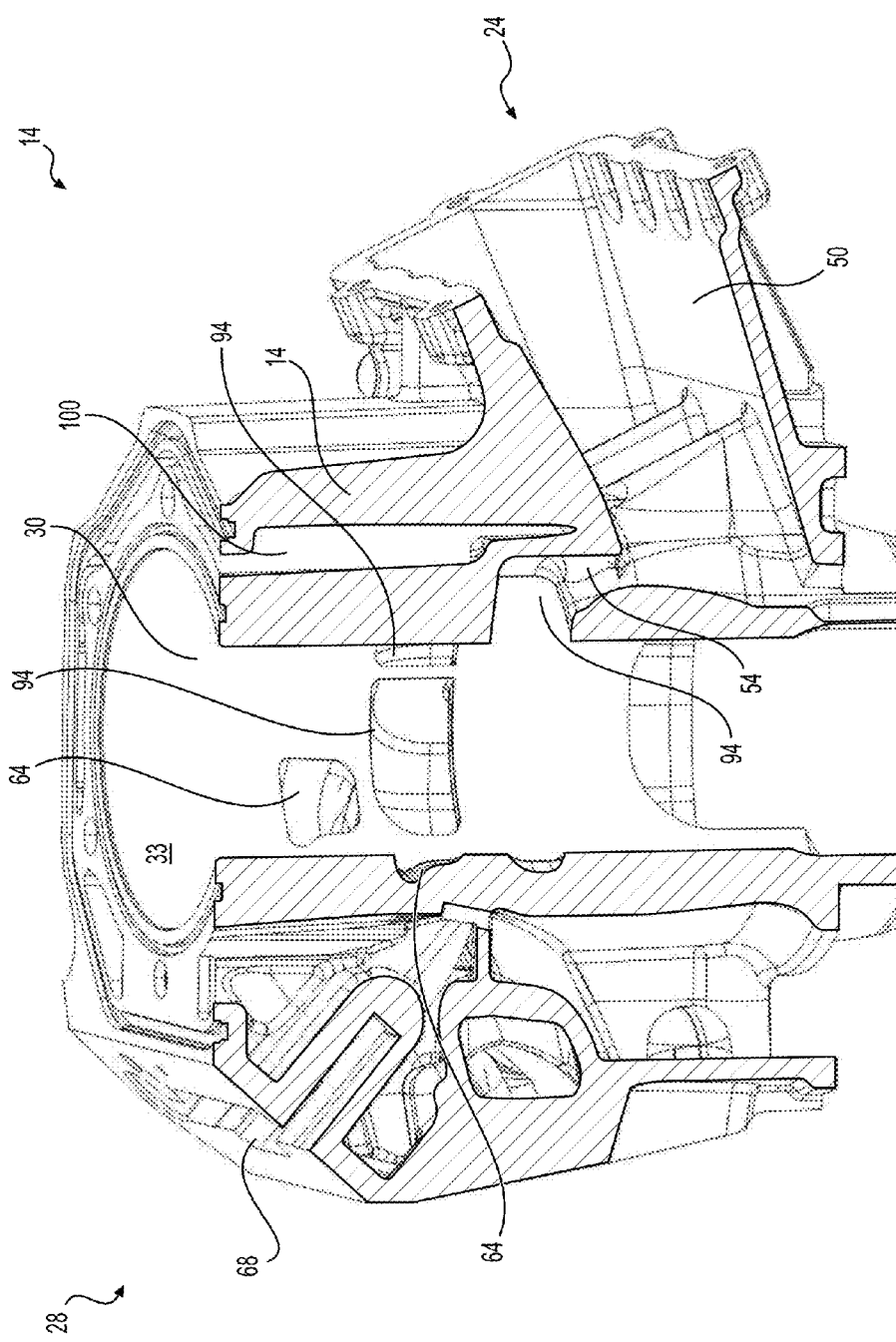
FIG. 8 is an enlarged view of a cylinder block portion of FIG. 7 with the piston removed for clarity.
Figure 9:
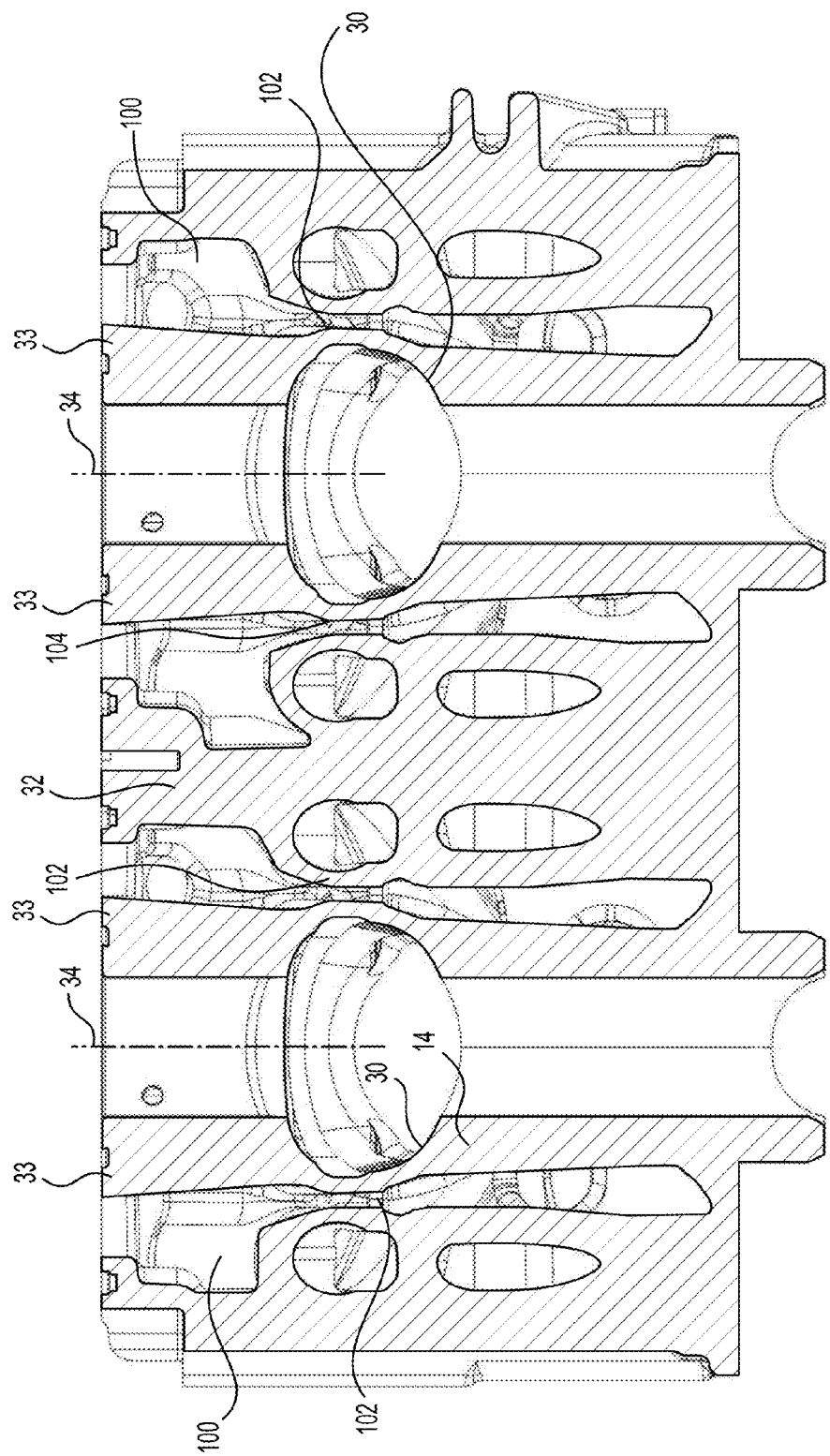
FIG. 9 is a cross-sectional view of the cylinder block of the internal combustion engine of FIG. 1, taken along the line 9-9 of FIG. 4.

Referring to FIGS. 5 to 9, the cylinder block 14 defines two cylinders 30 formed side-by-side therein but separated from another by a wall 32 of the cylinder block 14 (best seen in FIGS. 6 and 9). Each cylinder 30 has a cylinder wall 33 and cylinder axis 34, the cylinder axes 34 of each cylinder 30 being parallel to one another. It is contemplated that cylinder liners (not shown) could be provided inside each cylinder 30. The top of the cylinder 30 is closed by the cylinder head 16 disposed thereon (FIG. 5). The direction parallel to the cylinder axis 34 for each cylinder 30 will be referred to hereinafter as the axial direction. The downward axial direction is defined as a direction proceeding towards crankcase 12. The portion of the cylinder 30 further away from the crankcase 12 along the axial direction will be referred to as the upper portion of the cylinder 30, and the portion of the cylinder 30 proximal to the crankcase 12 will be referred to as the lower portion of the cylinder 30. It is contemplated that the cylinder axis 34 could not be vertical.

A piston 36 is disposed inside each cylinder 30 to reciprocate therein along a reciprocation axis (not shown) that is coaxial with the cylinder axis 34 of the cylinder 30. Each piston 36 is connected to the crankshaft 18 via a connecting rod 38 to drive the crankshaft 18. The cylinder head 16, the piston 36 and the cylinder 30 define a combustion chamber 40 in the upper portion of each cylinder 30, where the combustion process occurs. The fuel injectors 20 fluidly communicate with the combustion chambers 40 to supply fuel thereto. A piston ring 37 arranged around each piston 36 helps prevent gases present in the combustion chamber from entering the lower portion of the cylinder 30. In one embodiment, the piston ring and the form of the pistons are like the ones described in WO2014/019945 filed Jul. 25, 2013, the contents of which are herein incorporated by reference.

Each piston 36 has a piston crown 42 which is in communication with the combustion chamber 40. Defined within each piston 36 is a pair of diametrically opposite pin bores 44. The connecting rod 38 has one end received between the pin bores 40 and is connected to the piston 36 via a piston pin 46 received in the pin bores. The other end of the connecting rod 38 is connected to the crankshaft 18.

It is contemplated that the engine 10 could have one or more than two cylinders 30 with a corresponding number of pistons 36 and connecting rods 38. It is also contemplated that the cylinders 30 could have a configuration other than inline. For example, the cylinders 30 could be arranged such that their respective cylinder axes 34 form a V shape, in which case the engine 10 would be a V-type engine.

With reference to FIGS. 5 to 11C, the cylinder 30, and various ports defined in the inside wall of each cylinder 30 will now be described in more detail. For simplicity, the description below refers to a single cylinder although it will be appreciated that the description can apply to both cylinders of the two-cylinder engine.

On the intake side 24 of each cylinder 30, the intake socket 22 is connected to the cylinder 30 via an intake passage 50, and an intake port 52 (best seen in FIG. 5). The intake passage 50 and the intake port 52 are in fluid communication with the crankcase 12. The intake port 52 is located in the lower portion of the cylinder 30 on the intake side 24. Air enters from the intake socket 22 through the intake passage 50, and into the crankcase 12 and the lower portion of the cylinder 30 through the intake port 52. Reed valves 58 (FIGS. 5 and 7) are positioned in the intake passage 50 to prevent backflow of air into the intake socket 22. The reed valves 58 are not shown in FIG. 8.

Figure 11A:
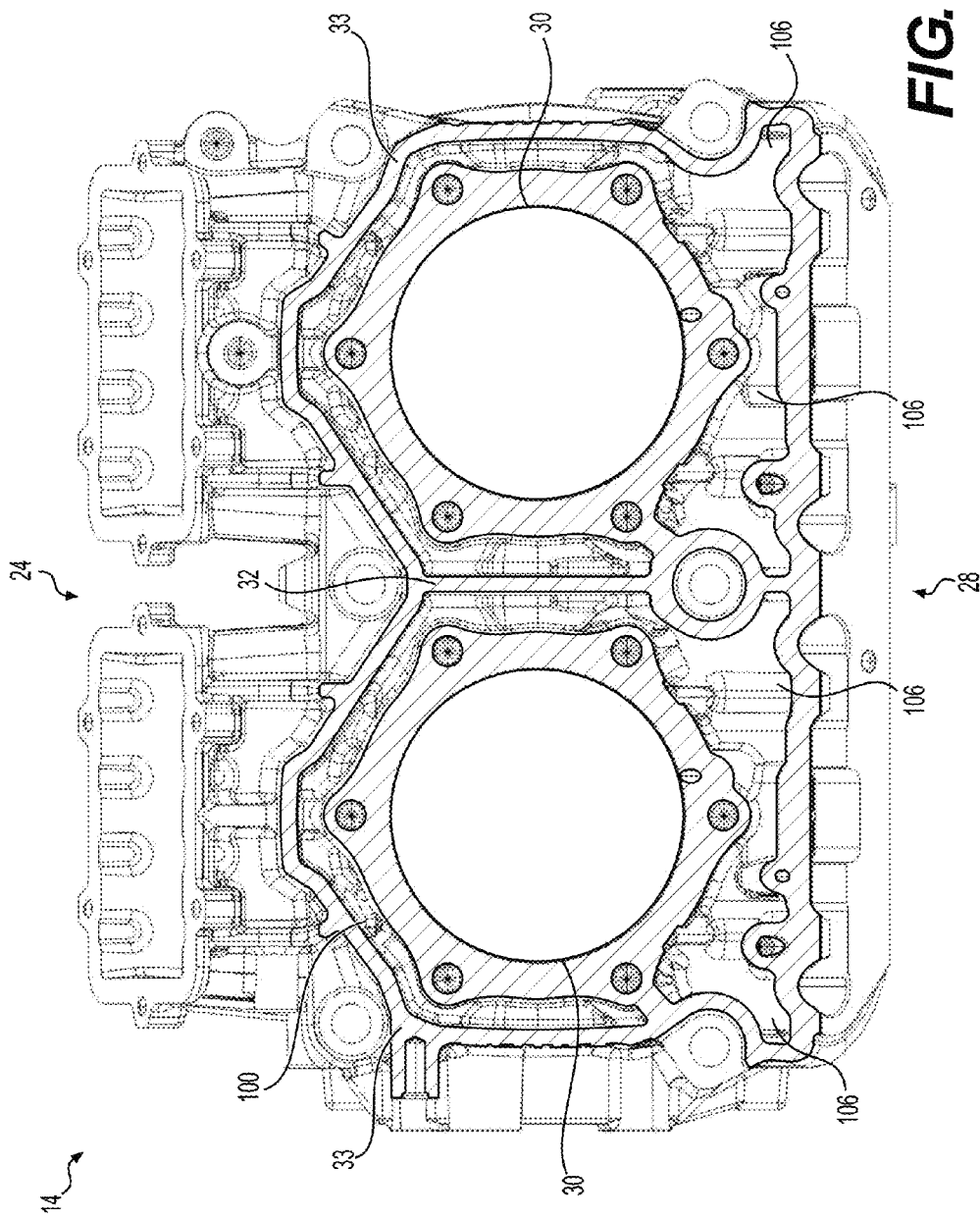
FIG. 11A is a cross-section of the internal combustion engine of FIG. 1, taken along the line 11A-11A of FIG. 3.
Figure 11B:
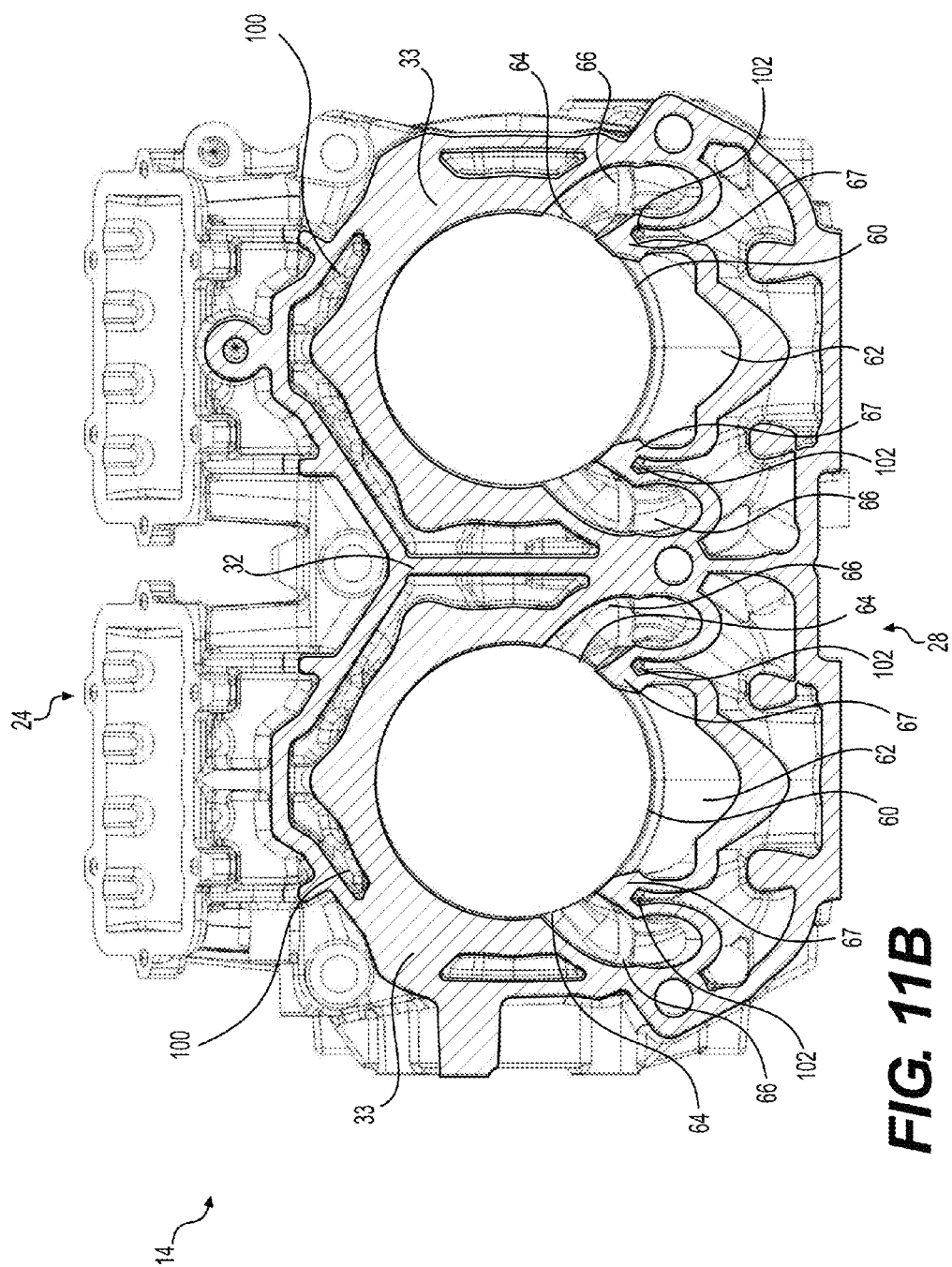
FIG. 11B is a cross-section of the internal combustion engine of FIG. 1, taken along the line 11B-11B of FIG. 3.
Figure 11C:
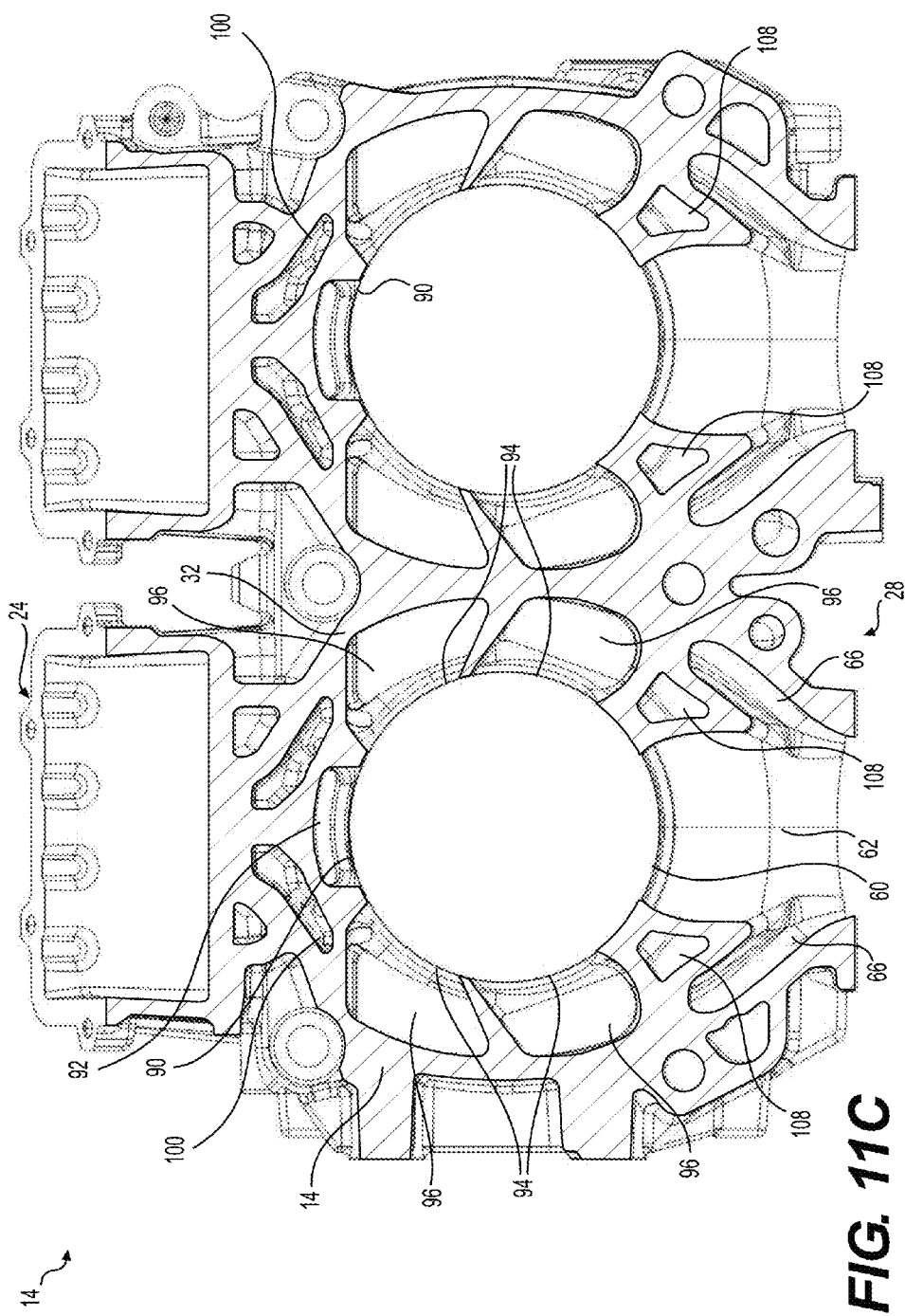
FIG. 11C is a cross-section of the internal combustion engine of FIG. 1, taken along the line 11C-11C of FIG. 3.

On the exhaust side 28, each cylinder 30 has defined therein an exhaust port 60 with an associated exhaust passage 62, and a pair of auxiliary exhaust ports 64 with associated auxiliary exhaust passages 66 (FIGS. 11B and 11C). The two auxiliary exhaust ports 64 are disposed one on either side of the exhaust port 60. The two auxiliary exhaust ports 64 are positioned circumferentially proximate the exhaust port 60. As best seen in FIGS. 11B and 11C, the auxiliary exhaust passages 66 extend from the auxiliary exhaust ports 64 initially away from the exhaust passage 62 and then towards the exhaust passage 62. The auxiliary exhaust passages 66 and the exhaust passage 62 join together in a direction towards the exhaust manifold 26. In other words, the auxiliary exhaust passages 66 extend from the exhaust passage 62, terminating at the auxiliary exhaust ports 64 at the cylinder 30. Proximate the cylinder 30, there is a bridge 67 of the cylinder block 14, separating each auxiliary exhaust passage 66 from the exhaust passage 62.

The exhaust manifold 26 is connected to each cylinder 30 via the exhaust passage 62 and its associated exhaust port 60, and the auxiliary exhaust passages 66 and their associated auxiliary exhaust ports 64. An exhaust valve passage 68 connecting to the exhaust ports 60, 64 is also defined on the exhaust side 28 of the cylinder 30. An exhaust valve assembly 70 of the exhaust valve passage 68 is configured to change the surface areas of the exhaust port 60 and of the auxiliary exhaust ports 64 depending on the operating conditions of the engine 10. It is contemplated that the exhaust valve assembly 70, and therefore its associated exhaust valve passage 68 could be omitted or replaced by an alternative exhaust valve assembly and passage. Additional details regarding one embodiment of the exhaust valve assembly 70 which could be used in the present disclosure can be found in U.S. Pat. No. 7,762,220, the entirety of which is incorporated herein by reference.

Figure 10:
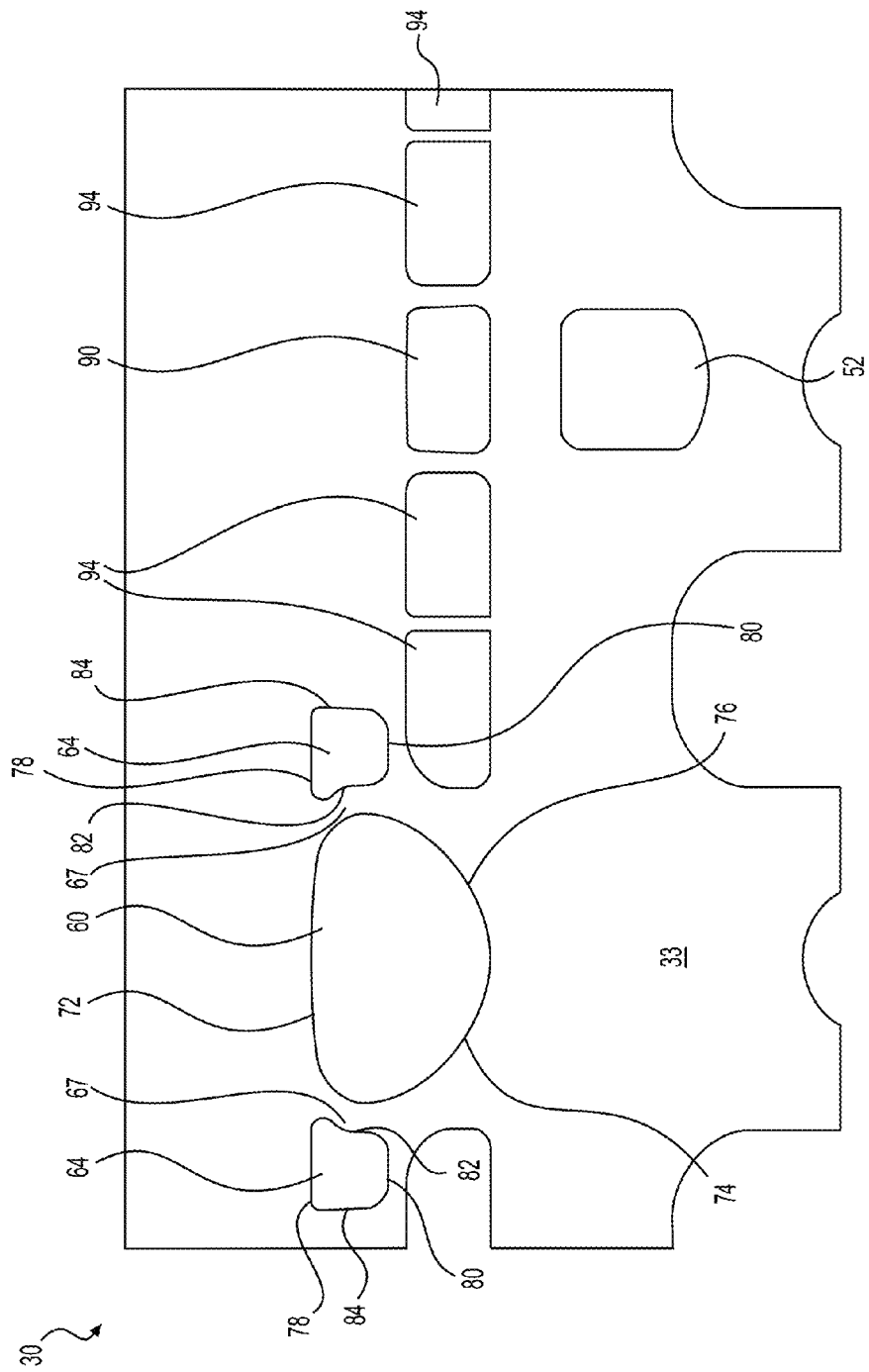
FIG. 10 is planar view of an inside surface of the cylinder block of FIG. 8.

As best seen in FIG. 10, the exhaust port 60 has a rounded triangular shape having an upper edge 72, a lower left edge 74 and a lower right edge 76. The upper, lower left and lower right edges 72, 74 and 76 are all curved outwardly along their length. The lower left and right edges 74, 76 extend downwardly from the left and right ends respectively of the upper edge 72. The lower left and right edges 74, 76 are connected to each other below the middle of the upper edge 72. The curved edges 72, 74 and 76 are connected to each other so as to form a triangular shape with rounded corners therebetween. The width of the exhaust port 60 in the circumferential direction of the cylinder 30 is larger than its height in the axial direction of the cylinder 30.

The auxiliary exhaust ports 64 are generally trapezoidal in shape. Each auxiliary exhaust port 64 has an upper edge 78, a lower edge 80, a first side edge 82 and a second side edge 84, with the first and second side edges 82, 84 connecting the upper and lower edges 78, 80. The upper edge 78 of each auxiliary exhaust port 64 is longer than the lower edge 80 of each auxiliary exhaust port 64. The first side edge 82 is proximate the main exhaust port 60 and has a profile which substantially corresponds to the profile of the main exhaust port 60 to which it is proximate. The first side edge 82 bends inwardly along its length, towards the second side edge 84.

The second side edge 84 is a straight edge. The upper and lower edges 78, 80 and the first and second side edges 82, 84 of the auxiliary exhaust ports 64 meet at rounded corners to form the trapezoidal shape.

The upper edge 72 of the exhaust port 60 is substantially aligned in the circumferential direction with the upper edge 78 of each auxiliary exhaust port 64. Each auxiliary exhaust port 64 is smaller in area than the exhaust port 60.

It is contemplated that there could be more or less than two auxiliary exhaust ports 64. It is contemplated that the shapes and sizes of the exhaust port 60 and the auxiliary exhaust ports 64 could differ from the shapes and sizes described herein. For example, one or more edges of the exhaust port 60 could be straight instead of curved, or the shape of the exhaust port 60 could be rectangular or oval instead of triangular. It is further contemplated that the positions of the auxiliary exhaust ports could be different from the positions described herein. For example, the upper edge 78 of each auxiliary exhaust port 64 could be lower or higher than the upper edge 72 of the exhaust port 60.

A central transfer port 90 and an associated central transfer passage 92, side transfer ports 94 and their associated side transfer port passages 96, are also defined on the intake side 24 of the cylinder 30. The central transfer port 90 and the side transfer port 94 are aligned circumferentially, and closer to the cylinder head 16 compared to the intake port 52. The transfer ports 90, 94 span over 128° circumferentially, along the intake side 24 of the cylinder 30. The central transfer and side transfer passages 92, 96 are fluidly connected to the crankcase 12. Air in the crankcase 12 and the lower portion of the cylinder 30 thus enters the combustion chamber 40 through the central transfer and side transfer ports 90, 94. In two-stroke engines, the transfer ports and passages are also known as scavenge ports and passages.

As best seen in FIG. 10, the central transfer port 90 and the intake port 52 are aligned in the axial direction of the cylinder 30. The side transfer ports 94 are disposed symmetrically on either side of the central transfer port 90 and aligned with the central transfer port 90 in the circumferential direction. The central and side transfer ports 90, 94 are generally rectangular in shape and smaller than the generally rectangular intake port 52.

It is contemplated that the central and side transfer ports 90, 94 could be configured in a different manner than that described and illustrated herein, for example, the shape, size and number of the central and the side transfer ports 90, 94 could differ.

As the piston 36 reciprocates in the cylinder 30, it opens and closes the central and side transfer ports 90, 94, the intake port 52, the exhaust port 60, and the pair of auxiliary exhaust ports 64, in a manner known in two-stroke internal combustion engines.

As the piston 36 moves upwardly in its upward stroke, fuel/air mixture the in the combustion chamber 40 is being compressed and a fresh intake charge is being sucked into the crankcase 12 through the intake port 52 and the intake passage 50. When the piston is positioned at its top dead center, as seen in the right side cylinder of FIG. 6, the intake port 52 is open, and the central and side transfer ports 90, 94, and the exhaust port 60 and the auxiliary exhaust ports 64, 64 are closed. As the piston 36 moves downwardly in its downward stroke, burnt gases from the combustion chamber 40 leave the engine 10 via the exhaust port 60 as the fresh intake charge in the crankcase 12 enters the cylinder 30 via the transfer ports 90, 94. When the piston 36 is positioned at its bottom dead center, as illustrated in the left side cylinder 30 of FIG. 6, the central and side transfer ports 90, 94, the exhaust port 60 and the auxiliary exhaust ports 64, 64 are open, and the intake port 52 is closed.

Figure 12:
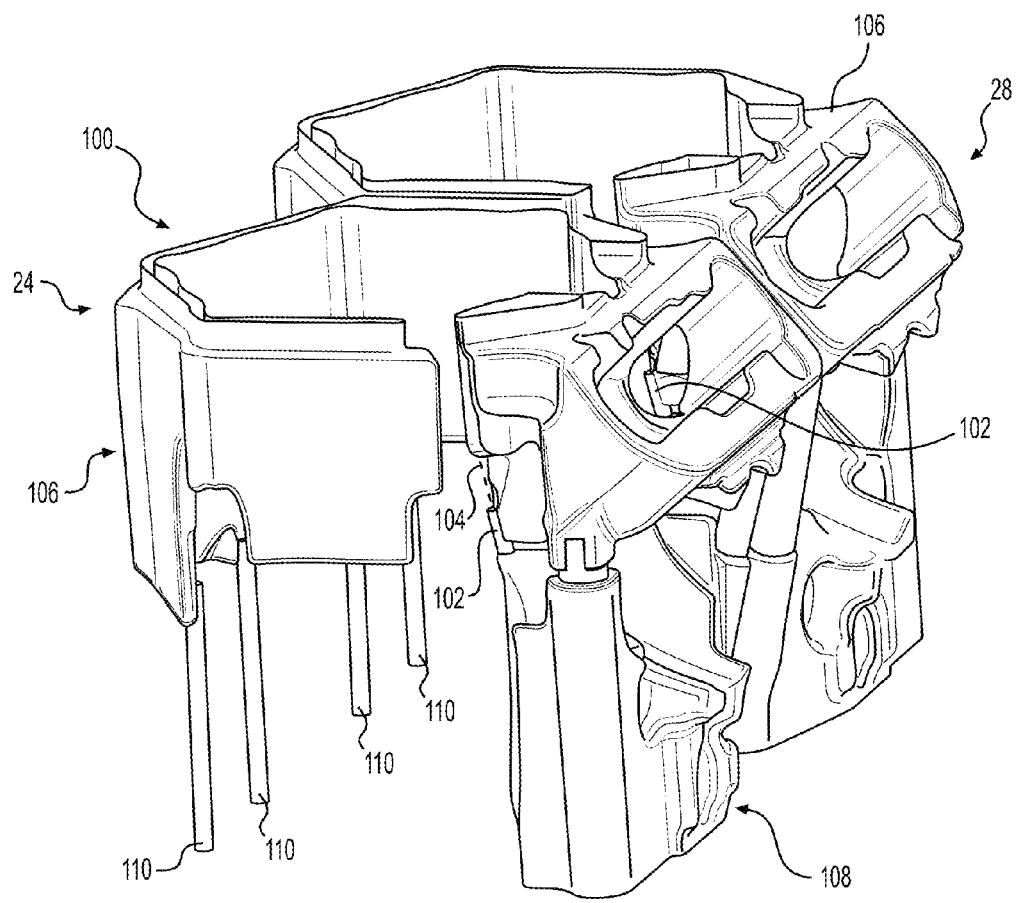
FIG. 12 is a perspective view, from the exhaust side, of a cooling jacket of the internal combustion engine of FIG. 1.
Figure 13:
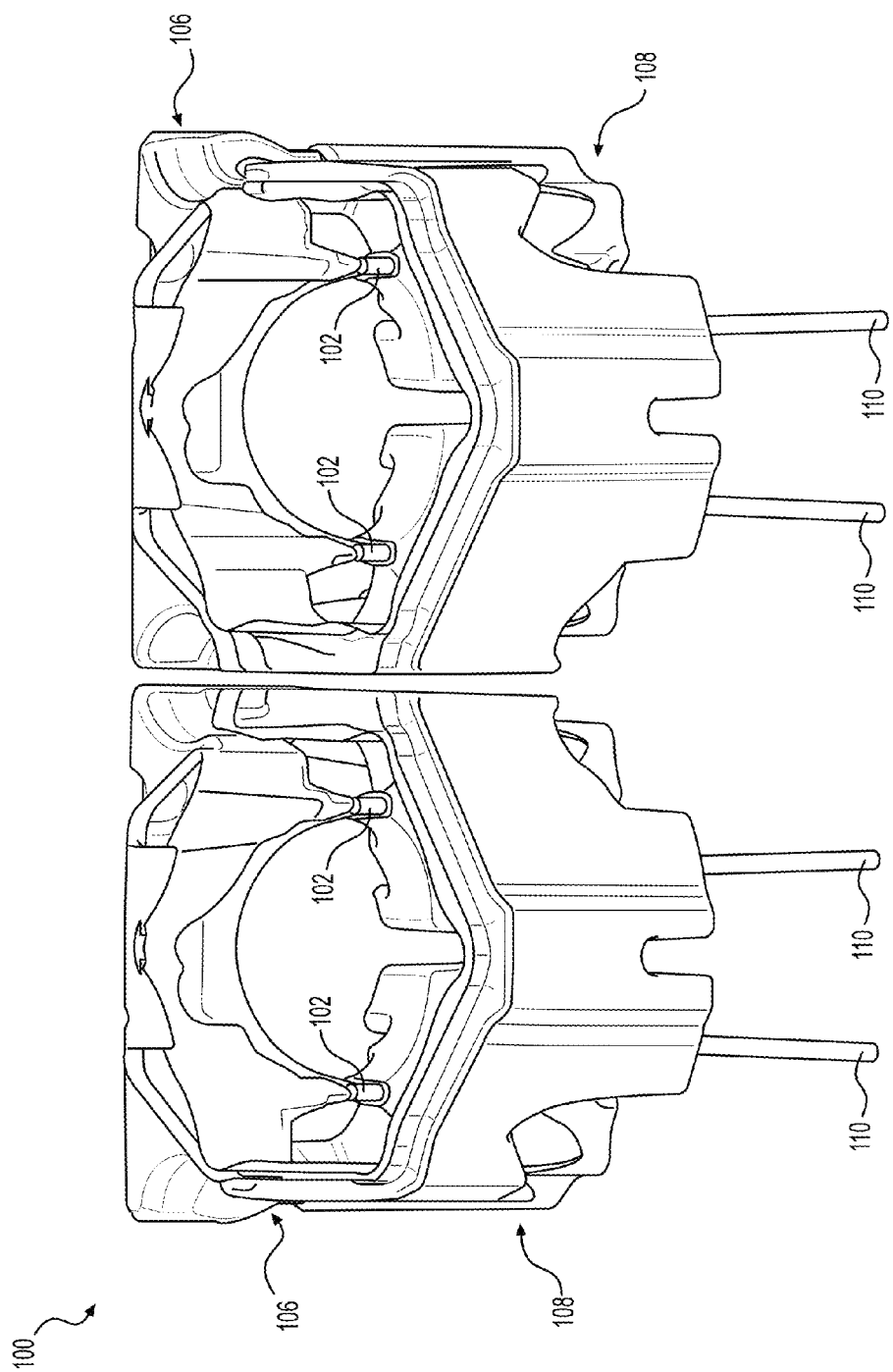
FIG. 13 is a perspective view, from the intake side, of the cooling jacket of FIG. 12.

The engine 10 also includes a cooling jacket 100 defined in the cylinder block 14 comprising fluidly connected passages formed within the cylinder block 14 for coolant to flow therethrough for cooling at least a portion of the cylinder 30. The cooling jacket 100 can be seen at least partially in FIGS. 6, 7, 8, 9, 11A, 11B and 11C. For ease of reference, FIGS. 12 and 13 show the cooling jacket 100 alone, without the cylinder block 14, as a 'cast' of the passages formed within the cylinder block 14 after the cylinder block 14 has been stripped away. The cooling jacket 100 has passages positioned on at least the exhaust side 28 of each cylinder 30, for cooling at least an exhaust side of each cylinder 30.

The cooling jacket 100 at least partially surrounds the cylinders 30 and includes cooling passages 102 positioned between each exhaust passage 62 and its' corresponding auxiliary exhaust passages 66. Therefore, formed in each cylinder block 50 are two cooling passages, and a total of four cooling passages in the engine 10. For simplicity, the description below will refer to a single cooling channel 102 but is equally applicable to all four cooling channels 102 of the engine 10.

The diameter of each cooling passage 102 is between about 2.5 and 3.0 mm. Each cooling passage 102 is positioned in the bridge 67 inbetween one auxiliary exhaust passage 66 and the corresponding exhaust passage 62. In some implementations, in the bridge 67 inbetween the auxiliary exhaust port 64 and the exhaust port 60, the cooling passage 102 is the most proximate part of the cooling jacket to the cylinder, and helps to cool the bridge 67 during operation of the engine 10. It is contemplated that the diameter of the cooling passage 102 can be different from the values given above.

The cooling passage 102 is cylindrical and extends generally in the direction of the cylinder head 16 towards the crankcase 12. The cooling passage has a cooling passage axis 104 (FIG. 12) which is substantially parallel to a plane that includes the cylinder axes 34 and the exhaust port center; and angled to a plane that includes both cylinder axes 34. However, it is contemplated that other orientations are possible. The cooling passage axes 104 are generally upright. It is contemplated that the shape of the cooling passage 102 could be other than cylindrical.

The cooling jacket 100 comprises an upper portion 106 (FIG. 11A and FIG. 12) and a lower portion 108 (FIG. 11C and FIG. 12), the upper and lower portions 106, 108 of the cooling jacket 100 being in fluid communication with each other, at least proximate the cylinder 30, via the cooling passages 102. The upper and lower portions 106, 108 of the cooling jacket 100 are fluidly connected to each other, at least by the cooling passages 102 formed in the bridges 67 between the auxiliary exhaust ports and passages 64, 66 and the exhaust port and passage 60, 62. In the bridges 67, the portions 106 and 108 are connected by the cooling passages 102.

Each cooling passage 102 is formed by drilling after formation of the cylinder block 14. The cylinder block 14 can be formed by permanent mold casting with sand cores. After forming the cooling passages 102, the cylinder block 14 is treated by pressure washing. A final deburring step may or may not be necessary. Alternatively, any other suitable method of making the cylinder block 14 and the cooling passages 102 is possible.

As can best be seen in FIGS. 11A, 11B and 11C, in the upper portion 106 of the cooling jacket 100, the cooling jacket 100 extends around at least a portion of the auxiliary exhaust passages 66, or extends along at least a portion of their length. In the lower portion 108 of the cooling jacket 100, the cooling jacket 100 extends around at least a portion of the auxiliary exhaust passages 66, or extends along at least a portion of their length. Inbetween the upper and lower cooling jackets 106, 108, the cooling jacket 100 extends to a lesser extent around or along the exhaust passages compared to the upper and lower cooling jackets 106, 108 and includes the cooling passage 102 proximate the cylinder 30.

The cooling jacket 100 extends at least partially around the auxiliary exhaust passages 66 in the axial direction of the cylinder 30 away from the auxiliary exhaust ports 64. The cooling jacket 100 also extends around at least a portion of the exhaust passages 62, or along at least a portion of a length of the exhaust passages 62. In the lower portion 108 of the cooling jacket 100, the cooling jacket 100 extends around the exhaust passages 62, proximate the exhaust ports 60.

The cooling jacket 100 described above is proximate the cylinders 30 and can also be called a first cooling jacket 100. A second cooling jacket 101 (shown schematically in FIG. 14) is provided proximate, and at least partially surrounding, the crankcase 12. The second cooling jacket 101 is fluidly connected to the first cooling jacket by connecting passages 110 (FIGS. 12 and 13) The second cooling jacket can be of the type described in U.S. Pat. No. 7,644,687, the contents of which are herein incorporated by reference.

Figure 14:
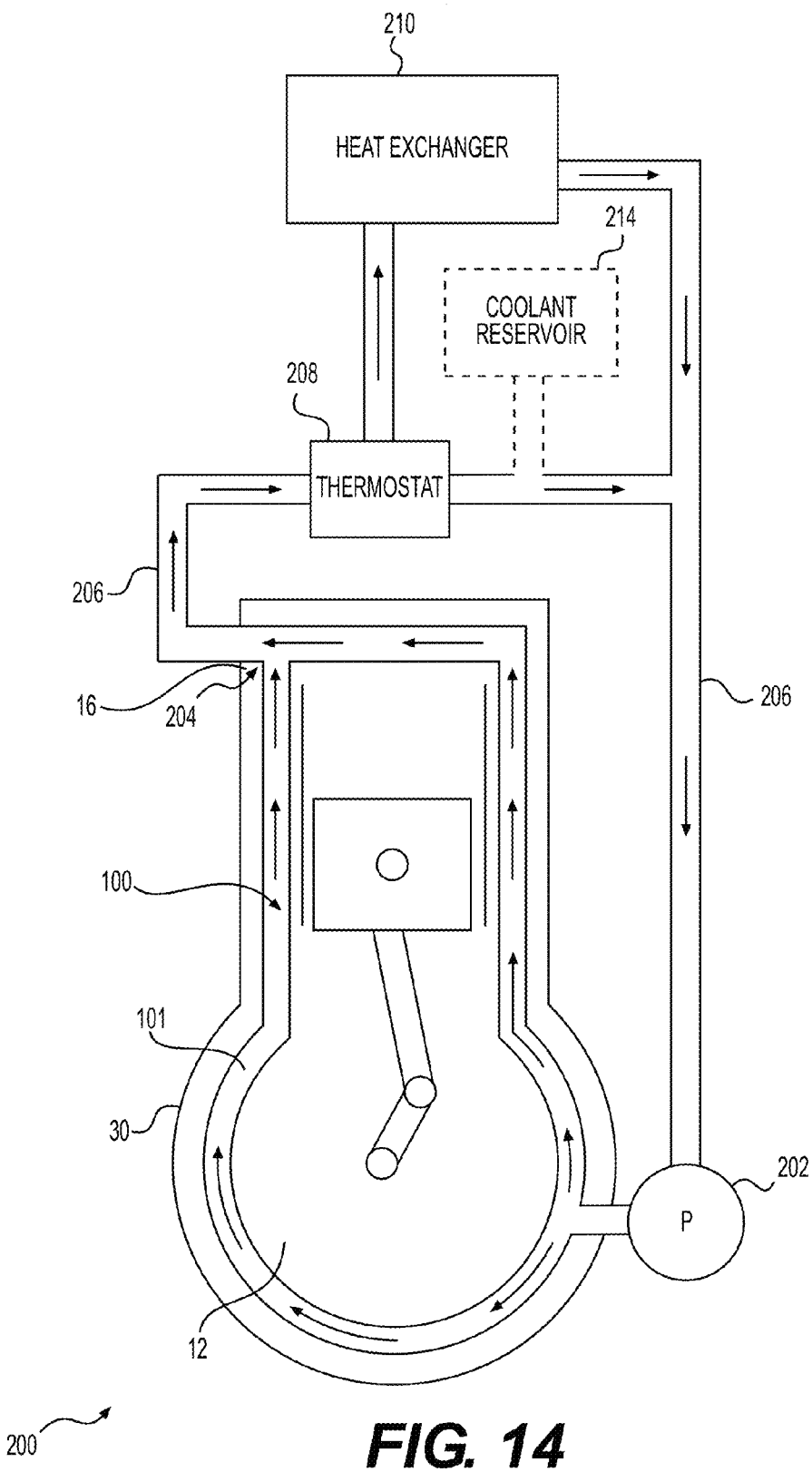
FIG. 14 is a schematic representation of a cooling circuit of the internal combustion engine of FIG. 1.

The cooling jacket 100 including the cooling passages 102 is part of a cooling circuit 200 of the engine 10 which is shown schematically in FIG. 14. The cooling circuit 200 includes the cooling jacket 100 formed within and extending within the cylinder block 30 in the manner described above. There is provided a pump 202 for pumping coolant through the cooling jacket 100, and an outlet 204 at the cylinder head 16 where the coolant leaves the cylinder block 30. An air vent (not shown) may be included at the outlet 204 of the cylinder head 16 to release air bubbles. At the outlet 204, the cooling jacket 100 is connected to a conduit 206 extending outside of the cylinder block 30. The conduit 206 extends from the outlet 204 to the pump 202, via a thermostat 208. Depending on the temperature of the coolant measured by the thermostat 208, the coolant is directed to a heat exchanger 210 to cool the coolant before the coolant is pumped back to the pump 202, or the coolant is directed directly back to the pump 202 without passing through the heat exchanger 210.

The pump 202 is usually positioned on a lowest possible portion of the crankcase 12 on the exhaust side 28 and is arranged to pump the coolant. As can be seen from arrows indicating coolant flow in FIG. 14, coolant flows upwardly through the second cooling jacket 101 around the crankcase, upwardly through the connecting passages 110 into the cooling jacket 100 around the cylinder 30. The cooling jacket 100 around the cylinder 30 is arranged to allow coolant to flow therethrough in a direction from the lower portion 108 of the first cooling jacket 100 to the upper portion 106 of the first cooling jacket 100.

The engine 10 also includes other components known to those skilled in the art, such as spark plugs, but since these are not believed to be necessary to the understanding of the present technology, they will not be described herein.

In another embodiment, the internal combustion engine 10 differs from the one described above in that there is provided a single auxiliary exhaust passage extending from the exhaust passage, instead of a pair of auxiliary exhaust passages. The single auxiliary exhaust passage is positioned between the cylinder head and the exhaust passage. A single cooling passage is provided in the bridge 67 of the cylinder block between the auxiliary exhaust passage and the exhaust passage.

The internal combustion engine 10 is suitable for incorporation in a vehicle such as a snowmobile. However, it is contemplated that aspects could be applied to other vehicles, including, but not limited to: side-by-side vehicles (SSVs), all-terrain vehicles (ATVs), on-road vehicles such as motorcycles, and marine outboard engines.

Figure 15:
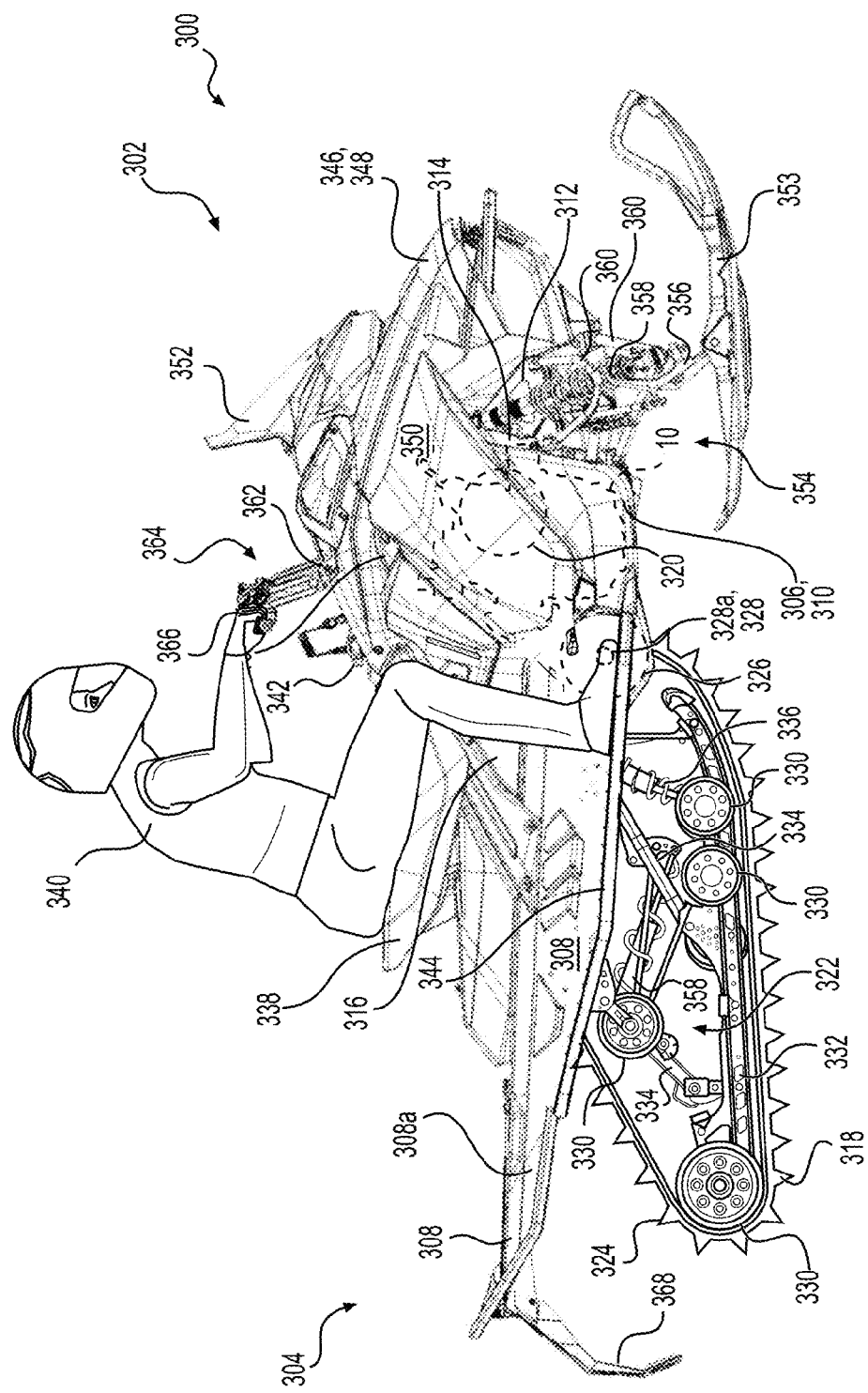
FIG. 15 is a side-elevational view of a snowmobile including the internal combustion engine of FIG. 1, according to certain implementations of the present disclosure.

With reference to FIG. 15, a snowmobile 300 includes a front end 302 and a rear end 304 which are defined consistently with a travel direction of the vehicle 300. The snowmobile 300 includes a vehicle body in the form of a frame or chassis 306 which includes a rear tunnel 308, an engine module 310, a front suspension module 312 and an upper structure 314. The tunnel 308 is formed from sheet metal parts assembled to form an inverted U-shape when viewed from the forward or rearward end 302, 304. The inverted U-shaped tunnel 308 has a left side portion and a right side portion 308a (only the right being shown).

The internal combustion engine 10 is carried in an engine compartment defined by the engine module 310 of the chassis 306 and provides, in part, propulsion of the snowmobile 300. A fuel tank 316, supported above the tunnel 308, supplies fuel to the engine 10 for its operation.

An endless drive track 318 is positioned generally under the tunnel 308, and is operatively connected to the engine 10 via a drivetrain including a belt transmission system (not shown) and a reduction gear assembly 320 (shown schematically). The endless drive track 318 is driven to run about a rear suspension assembly 322 connected to the frame 306 for propulsion of the snowmobile 300. The endless drive track 318 has a plurality of lugs 324 extending from an outer surface thereof to provide traction to the track 318.

The rear suspension assembly 322 includes a pair of drive sprockets 326 (shown schematically) mounted on a drive axle 328 (shown schematically), multiple idler wheels 330 and a pair of slide rails 332 in sliding contact with the endless drive track 318. The drive axle 328 having the drive sprockets 326 mounted thereon defines a drive axle axis 328a. The slide rails 332 are attached to the tunnel 308 by front and rear suspension arms 334 and one or more shock absorbers 336 which include a coil spring (not shown) surrounding the individual shock absorbers 336. It is contemplated that the snowmobile 300 could be provided with a different implementation of a rear suspension assembly 322 than the one shown herein.

A straddle-type seat 338 is positioned atop the fuel tank 316. The seat 338 is adapted to accommodate a driver 340 of the snowmobile 300. The seat 338 can also be configured to accommodate a passenger (not shown).

A fuel tank fill opening (not shown) covered by a cap 342 is disposed on an upper surface of the fuel tank 316 in front of the seat 338. It is contemplated that the fuel tank fill opening and the cap 342 could be disposed elsewhere on the fuel tank 316. A footrest 344 is positioned on each side of the snowmobile 300 below the seat 338 to accommodate the driver's feet. Each of the left and right footrests 344 extends generally laterally outwardly from the corresponding left and right side portion of the tunnel 308. In the illustrated implementation, each side portion 308a of the tunnel 308 is bent laterally outwardly at its bottom edge to form the corresponding footrest 344. It is however contemplated that the footrest 344 could be formed separately from and mounted to the tunnel 308.

At the front end 302 of the snowmobile 300, fairings 346 enclose the engine 10, the continuous variable transmission system and other components of a powerpack such as the air intake system. The fairings 346 include a hood 348 which can be opened to allow access to the engine 10 and other internal components of the snowmobile 300 from the top and the front which may be required, for example, for inspection or maintenance of the engine 10 and/or the powerpack. The fairings 346 also include two side panels 350 extending along the left and right sides of the snowmobile 300. The engine 10 and the transmission system are disposed between the side panels 350. The side panels 350 are both removably connected to the frame 306 and/or to other fairing panels and can be removed to access the internal components from the corresponding lateral side. A windshield 352 connected to the fairings 346 acts as a wind screen to lessen the force of the air on the rider 340 while the snowmobile 300 is moving.

Two skis 353 positioned at the forward end 302 of the snowmobile 300 are attached to the front suspension module 312 of the frame 306 through a front suspension assembly 354. The front suspension module 312 is connected to the front end of the engine module 310. The front suspension assembly 354 includes ski legs 356, shock absorbers 358, supporting arms 360 and ball joints (not shown) for operatively connecting to the respective ski leg 356, supporting arms 360 and a steering column 362.

A steering assembly 364, including the steering column 362 and a handlebar 366, is provided generally forward of the seat 338. The steering column 362 is rotatably connected to the frame 306. The lower end of the steering column 362 is connected to the ski legs 356 via a steering rod (not shown). The handlebar 366 is attached to the upper end of the steering column 362. The handlebar 366 is positioned in front of the seat 338. The handlebar 366 is used to rotate the steering column 362, and thereby the skis 353, in order to steer the vehicle 300. A throttle operator (not shown) in the form of a thumb-actuated throttle lever is mounted to the right side of the handlebar 366. Other types of throttle operators, such as a finger-actuated throttle lever and a twist grip, are also contemplated. A brake actuator (not shown), in the form of a hand brake lever, is provided on the left side of the handlebar 366 for applying brakes in the snowmobile 300 in a known manner. It is contemplated that the windshield 352 could be connected directly to the handlebar 366.

At the rear end of the snowmobile 300, a snow flap 368 extends downward from the rear end of the tunnel 308. The snow flap 368 protects against dirt that can be projected upward from the drive track 318 when the snowmobile 300 is being driven. It is contemplated that the snow flap 368 could be omitted.

The snowmobile 300 includes other components such as a display cluster, an exhaust system, an air intake system, and the like. As it is believed that these components would be readily recognized by one of ordinary skill in the art, further explanation and description of these components will not be provided herein.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An internal combustion engine comprising:
   a crankcase;
   a crankshaft adapted to rotate about a crankshaft axis and disposed at least in part in the crankcase;
   a cylinder block connected to the crankcase, the cylinder block defining a cylinder having a cylinder axis;
   a cylinder head connected to the cylinder block, the cylinder block disposed between the cylinder head and the crankcase,
   a piston disposed in the cylinder and operatively connected to the crankshaft, the cylinder, the cylinder head and the piston together defining at least one combustion chamber;
   an intake port defined by the cylinder block for allowing at least one combustion component to enter the combustion chamber;
   an exhaust port defined by the cylinder block, on an exhaust side of the internal combustion engine, for allowing exhaust gas to exit the combustion chamber through an exhaust passage extending from the exhaust port in the cylinder block;
   a first auxiliary exhaust port defined by the cylinder block and a second auxiliary exhaust port defined by the cylinder block, the first and second auxiliary exhaust ports positioned circumferentially one on either side of the exhaust port and connected to the cylinder for allowing exhaust gas to exit the combustion chamber;
   a first auxiliary exhaust passage in the cylinder block extending from the first auxiliary port;
   a second auxiliary exhaust passage in the cylinder block extending from the second auxiliary port;
   a cooling jacket defined in the cylinder block for cooling at least an exhaust side of the cylinder, the cooling jacket at least partially surrounding the cylinder and including a first cooling passage positioned between the exhaust passage and the first auxiliary exhaust passage, and a second cooling passage positioned between the exhaust passage and the second auxiliary exhaust passage, the cooling jacket on at least the exhaust side of the cylinder comprising an upper portion and a lower portion, the upper and lower portions of the cooling jacket being in fluid communication with each other via at least one of the first cooling passage and the second cooling passage.

2. The internal combustion engine of claim 1, wherein the first cooling passage is formed in the cylinder block, proximate the cylinder, and between the first auxiliary exhaust passage and the exhaust passage, and the second cooling passage is formed in the cylinder block, proximate the cylinder, and inbetween the second auxiliary exhaust passage and the exhaust passage.

3. The internal combustion engine of claim 1, wherein the first cooling passage is formed in a first bridge of the cylinder block, the first bridge being proximate the cylinder and separating the first auxiliary exhaust passage from the exhaust passage, and wherein the second cooling passage is formed in a second bridge of the cylinder block, the second bridge being proximate the cylinder and separating the second auxiliary exhaust passage from the exhaust passage.

4. The internal combustion engine of claim 3, wherein the first cooling passage is the most proximate part of the cooling jacket to the cylinder in the first bridge, and the second cooling passage is the most proximate part of the cooling jacket to the cylinder in the second bridge.

5. The internal combustion engine of claim 1, wherein the first cooling passage and the second cooling passage extend in a direction from the cylinder head to the crankcase.

6. The internal combustion engine of claim 1, wherein the first cooling passage has a first cooling passage axis, and the second cooling passage has a second cooling passage axis, the first and second cooling passage axes being substantially parallel to one another.

7. The internal combustion engine of claim 1, wherein the first and the second cooling passages are cylindrical.

8. The internal combustion engine of claim 1, wherein the cooling jacket is arranged to contain coolant therein, the first and second cooling passages being arranged to allow coolant to flow therethrough in a direction from the lower portion of the cooling jacket to the upper portion of the cooling jacket.

9. The internal combustion engine of claim 1, wherein the first and the second auxiliary exhaust ports are positioned circumferentially proximate the exhaust port.

10. The internal combustion engine of claim 1, wherein at least a portion of the cooling jacket extends around the first and the second auxiliary exhaust passages, along at least a portion of a length of the first and the second auxiliary exhaust passages.

11. The internal combustion engine of claim 1, wherein the cooling jacket is a first cooling jacket, the internal combustion engine further comprising a second cooling jacket at least partially surrounding the crankcase, the second cooling jacket being fluidly connected to the first cooling jacket.

12. The internal combustion engine of claim 11, wherein the first and second cooling jackets are part of a cooling circuit, the cooling circuit further including:
an outlet at the cylinder head, the outlet being connected via an external conduit to a pump positioned at a lower portion of the crankcase for pumping coolant through the first and second cooling jackets and for receiving coolant from the cylinder head via the conduit.

13. The internal combustion engine of claim 1, wherein the internal combustion engine is a two-stroke engine, and further comprises scavenge ports.

14. The internal combustion engine of claim 1, wherein the cylinder comprises at least two adjacent cylinders.

15. The internal combustion engine of claim 1, wherein the internal combustion engine is a two-stroke engine, the first cooling passage being formed in the cylinder block, proximate the cylinder, and in a first bridge between the first and auxiliary exhaust passage and the exhaust passage, and the second cooling passage being formed in the cylinder block, proximate the cylinder, in a second bridge between the second auxiliary exhaust passage and the exhaust passage, wherein the first and second cooling passages are substantially upright and are arranged to allow coolant contained within the cooling jacket to flow from the lower portion of the cooling jacket to the upper portion of the cooling jacket.

16. A snowmobile comprising:
a frame having a forward end and a rearward end;
a drive track assembly disposed below and supporting the rearward end of the frame;
a front suspension connected to the forward end of the frame;
two skis connected to the front suspension;
an internal combustion engine as claimed in claim 1, the internal combustion engine mounted on the frame and operatively connected to the drive track via a drive train for delivering propulsive power to the drive track.

17. An internal combustion engine comprising:
a crankcase;
a crankshaft adapted to rotate about a crankshaft axis and disposed at least in part in the crankcase;
a cylinder block connected to the crankcase, the cylinder block defining a cylinder having a cylinder axis;
a cylinder head connected to the cylinder block, the cylinder block disposed between the cylinder head and the crankcase,
a piston disposed in the cylinder and operatively connected to the crankshaft, the cylinder, the cylinder head and the piston together defining at least one combustion chamber;
an intake port defined by the cylinder block for allowing at least one combustion component to enter the combustion chamber;
an exhaust port defined by the cylinder block, on an exhaust side of the internal combustion engine, for allowing exhaust gas to exit the combustion chamber through an exhaust passage extending from the exhaust port in the cylinder block;
an auxiliary exhaust port defined by the cylinder block positioned proximate the exhaust port and connected to the cylinder for allowing exhaust gas to exit the combustion chamber;
an auxiliary exhaust passage in the cylinder block extending from the first auxiliary port; and
a cooling jacket defined in the cylinder block for cooling at least an exhaust side of the cylinder, the cooling jacket at least partially surrounding the cylinder and including a cooling passage positioned between the exhaust passage and the auxiliary exhaust passage, the cooling jacket on at least the exhaust side of the cylinder comprising a first portion and a second portion, the first and second portions of the cooling jacket being in fluid communication with each other via at least the cooling passage.

18. The internal combustion engine of claim 17, wherein the cooling passage is formed in the cylinder block, proximate the cylinder, and between the auxiliary exhaust passage and the exhaust passage.

19. The internal combustion engine of claim 17, wherein the cooling passage extends in a circumferential direction.

* * * * *